(12) United States Patent
Talbot (10) Patent No.: US 7,783,954 B2
(45) Date of Patent: Aug. 24, 2010

(54) SYSTEM FOR CONTROLLING HIGH-SPEED BIDIRECTIONAL COMMUNICATION

(75) Inventor: Gerald R. Talbot, Concord, MA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1011 days.

(21) Appl. No.: 11/518,843

(22) Filed: Sep. 11, 2006

(65) Prior Publication Data

US 2008/0065967 A1 Mar. 13, 2008

(51) Int. Cl.
*H03M 13/00* (2006.01)
(52) U.S. Cl. .................................... 714/758
(58) Field of Classification Search ............. 714/3–4, 714/746, 758
See application file for complete search history.

(56) References Cited

U.S. PATENT DOCUMENTS

| 6,321,282 | B1 | 11/2001 | Horowitz |
| 6,393,577 | B1 | 5/2002 | Akamatsu et al. |
| 6,516,282 | B2 | 2/2003 | Hedlund |
| 6,839,393 | B1 | 1/2005 | Sidiropoulos |
| 6,898,726 | B1 * | 5/2005 | Lee ........................... 713/503 |
| 7,366,947 | B2 * | 4/2008 | Gower et al. ................... 714/8 |
| 7,516,029 | B2 | 4/2009 | Kim |
| 2007/0208819 | A1 | 9/2007 | Talbot et al. |

FOREIGN PATENT DOCUMENTS

JP 2001 268059 9/2001

OTHER PUBLICATIONS

International Search Report; International Application No. PCT/US2007/019681; International Filing Date: Sep. 11, 2007; Mailed on Mar. 17, 2008.
Written Opinion of the International Searching Authority; International Application No. PCT/US2007/019681; International Filing Date: Sep. 11, 2007; Mailed on Mar. 17, 2008.
International Preliminary Report on Patentability mailed Nov. 24, 2008 in International Application No. PCT/US2007-019681 filed Sep. 11, 2007.

* cited by examiner

*Primary Examiner*—Shelly A Chase
(74) *Attorney, Agent, or Firm*—Meyertons, Hood, Kivlin, Kowert & Goetzel, P.C.; Stephen J. Curran (57) ABSTRACT

A system for controlling high-speed bidirectional communication includes a slave device such as a memory device, for example, coupled to a master device such as a memory controller, for example. The master device may be configured to control data transfer between the master device and the slave device. The master device may be configured to provide one or more clock signals to the slave device and during an initialization mode, the master device may modify a phase alignment of the one or more clock signals. Further the master device may subsequently modify a phase alignment of data transmitted from the master device based upon information received from the slave device.

21 Claims, 5 Drawing Sheets

| Pin | Col A | Col B | Pin | Col A | Col B | Pin | Col A | Col B | Pin | Col A | Col B |
|---|---|---|---|---|---|---|---|---|---|---|---|
| 1 | MCLK | MCLK | 35 | Data | GND | 69 | Addr | VDD | 102 | GND | CRC |
| 2 | MCLK | MCLK | 36 | GND | CRC | 70 | VDD | Addr | 103 | Data | GND |
| 3 | GND | GND | 37 | Data | CRC | 71 | Addr | Addr | 104 | GND | Data |
| 4 | GND | GND | 38 | GND | GND | 72 | VDD | VDD | 105 | Data | GND |
| 5 | Data | Data | 39 | Data | GND | 73 | Addr | Addr | 106 | GND | Data |
| 6 | GND | GND | 40 | GND | GND | 74 | VDD | VDD | 107 | Data | GND |
| 7 | Data | Data | 41 | Data | Data | 75 | Addr | FREE | 108 | GND | GND |
| 8 | GND | GND | 42 | GND | GND | 76 | Vreg | FREE | 109 | CRC | GND |
| 9 | CRC | Data | 43 | Data | Data | | KEY | KEY | 110 | CRC | Data |
| 10 | CRC | GND | 44 | GND | GND | 77 | GND | GND | 111 | GND | GND |
| 11 | GND | GND | 45 | Data | Data | 78 | Data | Data | 112 | Data | GND |
| 12 | Data | Data | 46 | GND | GND | 79 | GND | GND | 113 | GND | Data |
| 13 | GND | GND | 47 | CRC | Data | 80 | Data | Data | 114 | Data | GND |
| 14 | Data | Data | 48 | CRC | GND | 81 | GND | GND | 115 | GND | GND |
| 15 | GND | GND | 49 | GND | GND | 82 | CRC | Data | 116 | FREE | SPD |
| 16 | Data | Data | 50 | Data | Data | 83 | CRC | GND | 117 | SPD | SPD |
| 17 | GND | CRC | 51 | GND | GND | 84 | GND | Data | 118 | VDD | VDD |
| 18 | Data | CRC | 52 | FREE | GND | 85 | Data | GND | 119 | MCLK | MCLK |
| 19 | GND | GND | 53 | RESET | Vref | 86 | GND | Data | 120 | MCLK | MCLK |
| 20 | Data | Data | 54 | Vref | VDD | 87 | Data | GND | | | |
| 21 | GND | GND | 55 | VDD | Addr | 88 | GND | Data | | | |
| 22 | Data | Data | 56 | Addr | Addr | 89 | Data | GND | | | |
| 23 | GND | GND | 57 | Addr | VDD | 90 | GND | Data | | | |
| 24 | Data | Data | 58 | VDD | Addr | 91 | Data | CRC | | | |
| 25 | GND | GND | 59 | Addr | Addr | 92 | GND | CRC | | | |
| 26 | Data | Data | 60 | Addr | VDD | 93 | Data | GND | | | |
| 27 | GND | GND | 61 | VDD | Addr | 94 | GND | Data | | | |
| 28 | CRC | Data | 62 | Addr | Addr | 95 | Data | GND | | | |
| 29 | CRC | GND | 63 | Addr | VDD | 96 | GND | Data | | | |
| 30 | GND | GND | 64 | VDD | Addr | 97 | Data | GND | | | |
| 31 | Data | Data | 65 | Addr | Addr | 98 | GND | Data | | | |
| 32 | GND | GND | 66 | Addr | VDD | 99 | Data | GND | | | |
| 33 | Data | Data | 67 | VDD | Addr | 100 | GND | GND | | | |
| 34 | GND | GND | 68 | Addr | Addr | 101 | Data | CRC | | | |

Pins 121–240 (continued):

| Pin | Val | Pin | Val | Pin | Val |
|---|---|---|---|---|---|
| 121 | MCLK | 161 | Data | 201 | Data |
| 122 | MCLK | 162 | GND | 202 | GND |
| 123 | GND | 163 | Data | 203 | Data |
| 124 | GND | 164 | GND | 204 | GND |
| 125 | Data | 165 | Data | 205 | Data |
| 126 | GND | 166 | GND | 206 | Data |
| 127 | Data | 167 | Data | 207 | GND |
| 128 | GND | 168 | GND | 208 | Data |
| 129 | Data | 169 | Data | 209 | GND |
| 130 | GND | 170 | Data | 210 | Data |
| 131 | Data | 171 | Data | 211 | CRC |
| 132 | GND | 172 | GND | 212 | GND |
| 133 | Data | 173 | Vref | 213 | Data |
| 134 | GND | 174 | VDD | 214 | GND |
| 135 | Data | 175 | Addr | 215 | Data |
| 136 | GND | 176 | Addr | 216 | GND |
| 137 | CRC | 177 | VDD | 217 | Data |
| 138 | CRC | 178 | Addr | 218 | GND |
| 139 | GND | 179 | Addr | 219 | Data |
| 140 | Data | 180 | VDD | 220 | GND |
| 141 | GND | 181 | Addr | 221 | CRC |
| 142 | Data | 182 | Addr | 222 | CRC |
| 143 | GND | 183 | VDD | 223 | GND |
| 144 | Data | 184 | Addr | 224 | Data |
| 145 | GND | 185 | Addr | 225 | GND |
| 146 | Data | 186 | VDD | 226 | Data |
| 147 | GND | 187 | Addr | 227 | GND |
| 148 | Data | 188 | Addr | 228 | Data |
| 149 | GND | 189 | VDD | 229 | GND |
| 150 | Data | 190 | Addr | 230 | Data |
| 151 | GND | 191 | Addr | 231 | GND |
| 152 | Data | 192 | VDD | 232 | Data |
| 153 | GND | 193 | Addr | 233 | GND |
| 154 | Data | 194 | VDD | 234 | Data |
| 155 | GND | 195 | VDD | 235 | GND |
| 156 | CRC | 196 | FREE | 236 | SPD |
| 157 | CRC | | KEY | 237 | SPD |
| 158 | GND | 197 | GND | 238 | VDD |
| 159 | Data | 198 | Data | 239 | MCLK |
| 160 | GND | 199 | GND | 240 | MCLK |

SYSTEM FOR CONTROLLING HIGH-SPEED BIDIRECTIONAL COMMUNICATION

BACKGROUND OF THE INVENTION

1. Field of the Invention

This invention relates to communication links and, more particularly, to controlling communication between a master device and a slave device over bidirectional links.

2. Description of the Related Art

Many systems employ conventional high-speed bidirectional signaling schemes in which the work of controlling amplitude and phase of the signals sent over a channel may be divided equally between each end of a communication link. In such systems, the control of the link may be symmetric such that the transmitter and the receiver at each end of the link may include very similar functionality.

An example of such a system may be a memory system, where there may be a complex master device (e.g., memory controller) and simpler slave devices (e.g., memory devices). The bidirectional data transfers would correspond to write data when transferring to the slave and read data when transferring from the slave.

To allow transfers to occur at high data rates, a clock phase recovery function may be implemented in the receiver at each end of the bi-directional data bus. For channels with significant high frequency loss or reflections, the channel may be equalized to prevent data eye closure from the effect of inter-symbol interference (ISI). In addition, links that have high data transfer rates may have a significant likelihood of bit errors occurring. Thus, a means of error detection is typically implemented. As mentioned above, these functions may be conventionally implemented at both ends of the link. However, it may be desirable to simplify slave devices while maintaining control of the analog properties of the data waveforms that travel in both directions.

SUMMARY

Various embodiments of a system and method for controlling high-speed bidirectional communication between a master device and a slave device are disclosed. In one embodiment, the system includes a slave device such as a memory device, for example, coupled to a master device such as a memory controller, for example. The master device may be configured to control data transfer between the master device and the slave device. The master device may be configured to provide one or more clock signals to the slave device and during an initialization mode, the master device may modify a phase alignment of the one or more clock signals. Further the master device may subsequently modify a phase alignment of data transmitted from the master device based upon information received from the slave device.

In one specific implementation, the master device includes a receiver phase adjustment circuit that may adaptively modify a phase alignment of a receiver sample clock of the master device dependent upon data received from the slave device during each read operation performed by the master device.

In another specific implementation, during normal operation the master device may adaptively modify the phase alignment of the data transmitted by the master device via a plurality of bidirectional data paths depending upon a calculated error rate of data received from the slave device. For example, the master device may transmit a predetermined pattern to the slave device and adjust the phase alignment of the transmitted data in one direction until a substantially 50% calculated transition error rate is achieved. In addition, the master device may subsequently adjust the phase alignment of the transmitted data in the other direction an amount substantially equal to one half of a data bit period, which may correspond to the middle of each data bit.

BRIEF DESCRIPTION OF THE DRAWINGS

FIG. 5 is a diagram illustrating an exemplary pin out diagram of the memory module shown in FIG. 4.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
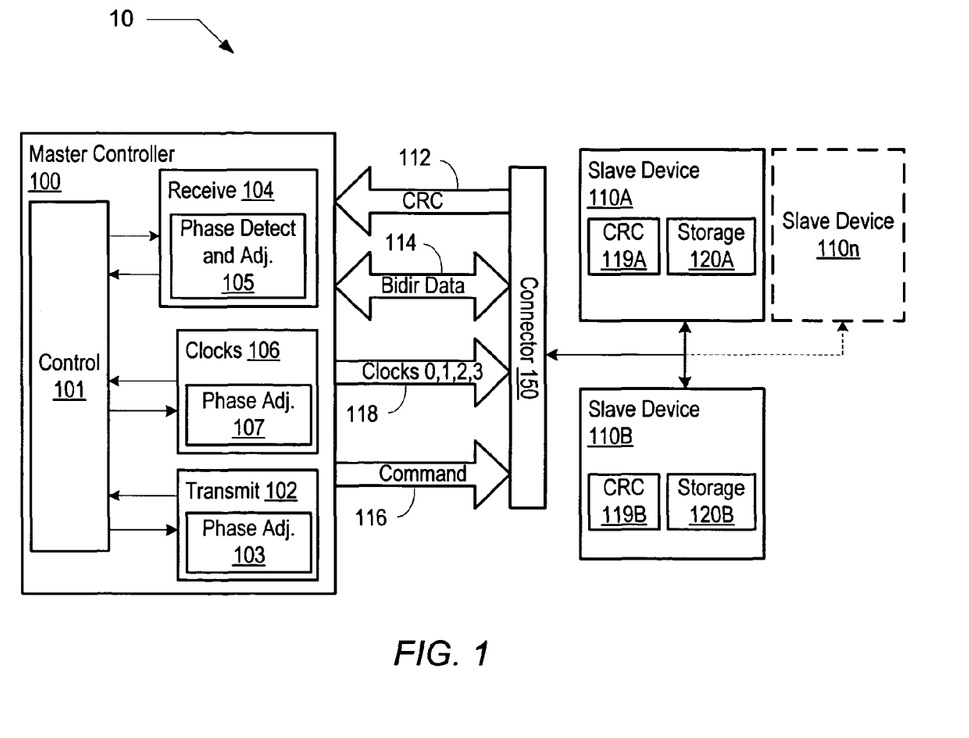
FIG. 1 is a block diagram of one embodiment of a system including asymmetric control of bidirectional data transfer.

Turning now to FIG. 1, a block diagram of one embodiment of a system including asymmetric control of bidirectional data transfer is shown. System 10 includes a master controller 100 coupled to slave devices 110A through 110n via a plurality of signal paths and a connector 150. As shown, the signal paths include bidirectional (bidir) data paths 114, command paths 116, and cyclic redundancy code (CRC) information paths 112, and clocks 118. It is noted that slave device 110n is meant to illustrate that any number of slave devices may be used. It is also noted that components that include a reference designator having a number and a letter may be referred to by the number only. For example, slave device 110A may be referred to as slave device 110 where appropriate.

In the illustrated embodiment, master controller 100 includes a control unit 101 that is coupled to a transmit unit 102, a receive unit 104, and a clocks unit 106. In one implementation, system 10 may be an example of a memory subsystem. As such, master controller 100 may be a memory controller and slave devices 110A-110n may be memory devices such as devices in the dynamic random access memory (DRAM) family of memory devices, for example. As such, connector 150 may be a "finger" connector such as may be found on a memory module that includes a plurality of memory devices such as slave devices 110. However, it is noted that in general, system 10 may be representative of any type of system that employs bidirectional data paths.

In one embodiment, command paths 116 may convey address and control information via single ended signal paths. Bidirectional (Bidir) data paths 114 may convey data in both directions via bidirectional single ended signal paths. The bidirectional data paths 114 may include a number of eight-bit (byte-wide) data paths. For example, the full data path may be 64 bits wide, but the full data path may be divided into byte-sized portions. It is noted that the full data path may include any number of data bits, and be divided into different sized portions. CRC paths 112 may convey CRC information from slave 110 to master controller 100 via unidirectional single ended signal paths. In one embodiment, CRC paths 112 may include two signal paths to convey two CRC bits, although any number of signal paths and bits may be used. In addition, clocks paths 118 may convey clock signals 0, 1, 2, and 3 to each of slave deices 110. In one implementation each of the clock signals 0-3 may be conveyed as differential signal pairs.

Figure 2:
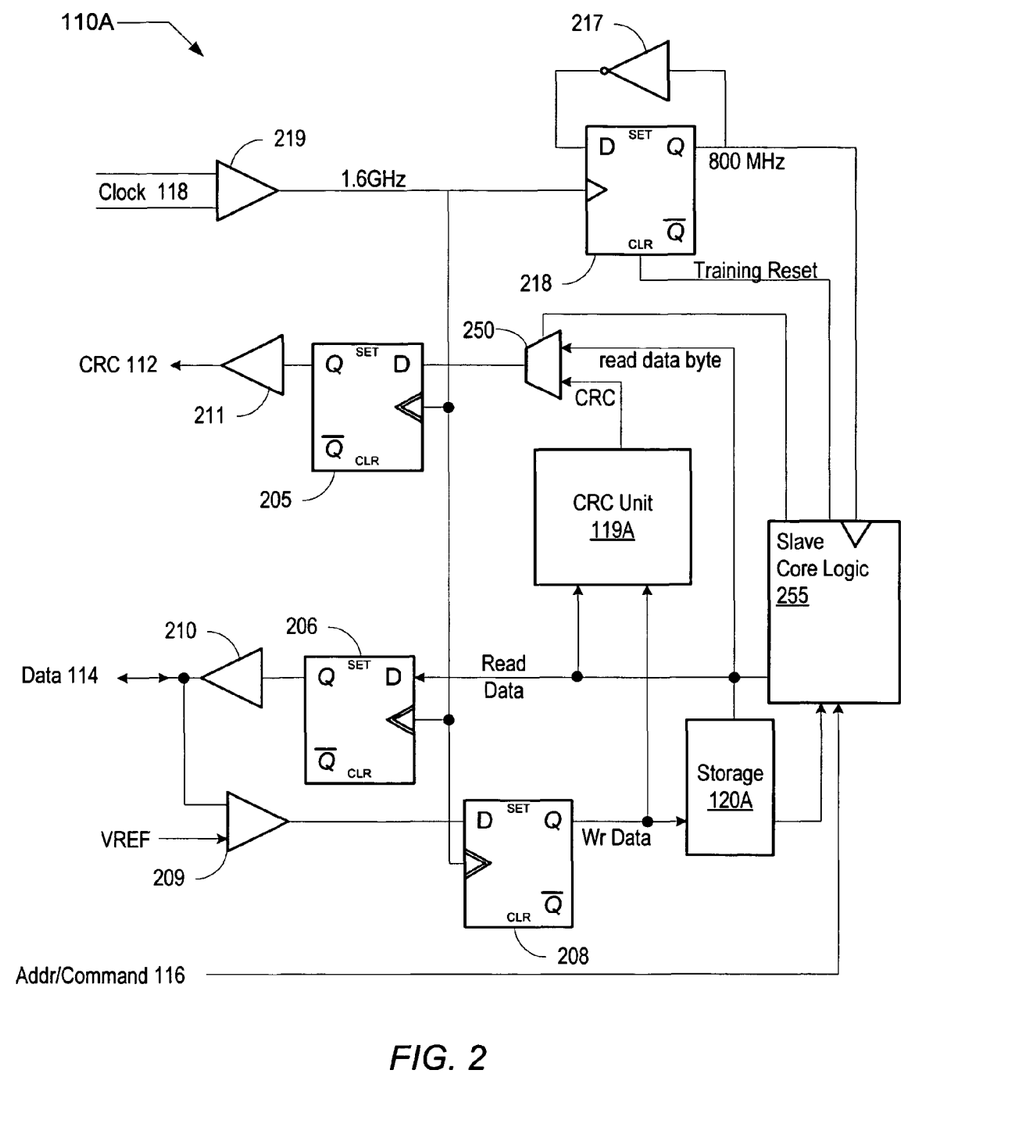
FIG. 2 is a diagram illustrating more detailed aspects of one embodiment of a slave device of FIG. 1.

At high data rates the probability of a slave device 110 or master controller 100 receiving a bit error is significant. Accordingly, it may be necessary to protect transfers with an error detection code that will robustly detect multiple bit errors within a protected block. In one embodiment, a CRC code may be used to provide such multiple bit error detection. More particularly, as shown in FIG. 2, to simplify the logic in the slave device and reporting of errors to master controller 100, slave device 110 calculates a CRC based on either the data it is generating or the data that it is receiving. Accordingly, to transfer the CRC information back to master controller 100 one or more unidirectional CRC signal paths 112 may be used. As shown in FIG. 2, CRC generation unit 119A which calculates the CRC based on its internal data, and sends the CRC data back to master controller 100. When an error is detected on the link in either direction, master controller 100 may correct the error by retrying the operation.

In one embodiment, the CRC information may be calculated and sent in parallel with the data on a transfer from slave device 110 to master controller 100 so that the CRC may be available at the same time as the data block it is protecting when it reaches master controller 100. In one embodiment, delays associated with calculating the CRC, may be mitigated by delays introduced on the data paths during write-to-read, and read-to-write transitions.

As mentioned above, many conventional systems control high-speed bidirectional communication by implementing control functions such as clock phase recovery, channel equalization, error detection, for example, in both communicating devices. However, as described in greater detail below, slave device 110 may be simplified. As such, master controller 100 may include control functionality that may dynamically and adaptively adjust the signal characteristics (e.g., phase, etc.) of transmitted write data to enable slave device 110 to correctly read the data based upon information received from slave device 110. In addition, master controller 100 may adjust its internal receiver characteristics to enable master controller 100 to receive data sent by slave device 110. Further, master controller 100 may adjust the phase of clock signals 118 that are provided to slave device 110 to enable address and command information to be correctly sampled.

More particularly, at high data rates the uncertainties of delays in the transmission path for different signals in a bus may require a per bit phase adjustment of a sample clock of a receiver of those signals. To avoid employing this circuitry in slave device 110, master controller 100 may adjust the phase of its transmitted clock and data signals to avoid complex phase shifting circuits in the slave. Thus, control unit 101 may calculate phase information based on data received from slave device 110 that may be used to adjust the phase of various clock edges within master controller 100. For example, in response to such information as CRC data and read data, control unit 101 may control phase tracking and adjustment circuits 103, 105, and 107 within transmit unit 102, receive unit 104, and clock unit 106, respectively.

Referring to FIG. 2, a diagram illustrating more detailed aspects of one embodiment of a slave device of FIG. 1 is shown. It is noted that slave device 110A may be representative of any slave device shown in FIG. 1. Slave device 110A of FIG. 3 includes core logic 255 which is coupled to receive address and command signals 116. Slave device 110A also includes a data input buffer 209 that is coupled to receive one signal path of bidir data paths 114 and a VRef signal. The write data output of buffer 209 is coupled to an input of a flip-flop (FF) 208. The output of FF 208 is coupled to an input of CRC unit 119A and to storage 120A. A read data out signal from storage 120A is coupled to an input of FF 206. The output of FF 206 is coupled to a data output buffer 210 which is coupled to the same signal path of bidir data paths 114. The read data out signal is also coupled to an input of CRC unit 119A.

The output of CRC unit 119A is coupled to one input of a two input multiplexer 250. The output of multiplexer 250 is coupled to the input of FF 205. The output of FF 205 is coupled to output buffer 211 is coupled to one signal path of CRC and signal paths 112. The other input to multiplexer 250 is a data byte of the read data. The CRC signal paths may be multiplexed with read data. The multiplexer input select is provided by slave core logic 255. It is noted that although only one signal path and thus one bit of data is shown, depending on the number of data bits that each slave device operates on, there may be any number of data signal paths. For example, in embodiments in which slave device is a DRAM device, there may be four, eight, 16, etc. data path signals to each device.

In the illustrated embodiment, clock 118 is provided to input buffer 219 as a differential signal at 1.6 GHz, although it is contemplated that other frequencies may be used. The output of buffer 219 is a single ended clock signal that is coupled to the clock input of FF 218. The output of FF 218 is coupled back to the input of FF 218 through an inverter 217, thus FF 218 divides the 1.6 GHz clock by two. The 800 MHz output of FF 218 is also used to clock circuits within slave core logic 255. The clear input of FF 218 is coupled to slave core logic 255 and is designated as "training reset." As shown, each of FF 205, FF 206, FF 208, and FF 218 are clocked by the 1.6 GHz clock. Further, FF 205, FF 206, and FF 208 are shown as dual edge flip flops, meaning they are configured to latch the 'D' input on both the leading and trailing edge of the input clock signal. Accordingly, read data, write data, and CRC information may be conveyed at 3.2 GHz on their respective data paths.

In one embodiment, when write data is received, it is latched by FF 208 and stored to storage 120A. In various embodiments, storage 120A may represent any type of storage that may store data. For example, in one implementation, storage 120A may include a memory storage array arranged in rows and columns including corresponding sense amplifiers such as may be found in a typical DRAM device. The particular rows and columns of the storage array may be accessed based upon the address and commands received on address command signal paths 116. In addition, storage 120A may include one or more independently accessible registers that may also be accessed based upon the address and commands received on address command signal paths 116.

As mentioned above, CRC information is transmitted from slave device 110 to master controller 100 via multiplexer 250. As shown in FIG. 2, the CRC signal paths 112 may convey a data byte data during portions of the read data cycle. More particularly, in one embodiment, two CRC signal paths may protect 8 data paths. On a transfer from slave device 110 to master controller 100, the correctness of the data in the block may not be established until all of the data block and the CRC have been received. However, this increases the latency for the first portion of the block which might be a critical word for forward progress in the system.

Accordingly, in one embodiment, the critical word may be additionally protected by including an additional in-line error code that is inserted between the critical word and the rest of the block. For example, the additional error detection information may be implemented by repeating the critical word (e.g., byte 0) at the beginning of the read data block. By sending the critical word twice, master controller 100 may validate that each bit is identical between the two copies and substantially lower the error rate for the critical word, thus allowing the critical word to be treated as valid before the complete CRC for the block has been received. Said in another way, during a read operation, slave device 110 may send the critical word during the first two beats or bit times of the read block. In one embodiment, to allow room for two copies of the critical first data word, one of the data bytes (e.g., data byte 3) may be output on the CRC paths during the first four beats of a read block. It is noted that to get adequate error coverage from the CRC while minimizing impact on bus efficiency, the data may be grouped in blocks over which the CRC is calculated.

As will be described in greater detail below in conjunction with the description of FIG. 3, during operation, master controller 100 may dynamically and adaptively adjust the signal characteristics (e.g., phase, etc.) of transmitted write data and its internal receiver characteristics, and adjust the phase of clock signals 118 that are provided to slave device 110. More particularly, as mentioned above, receive unit 104 includes sample clock phase adjustment circuits 105, which may include a bang-bang phase detector (not shown). As such, whenever master controller 100 is receiving data from slave device 110, receive unit 104 may use the bang-bang phase detector to adjust its own local sample clock phase to more optimally receive data transmitted by slave device 110. In addition, master controller 100 includes clock phase adjustment logic 107 that may be used to adjust the phase of each clock signal 120. During an initialization process such as during a power-on reset, for example, master controller 100 may adjust the phase of each clock signal 118 to enable each slave device to correctly sample address and command signals 116. Further, master controller 100 includes transmit data phase adjustment logic 103 which may be used to adjust the phase of the write data transmitted to slave device 110A. During initialization and during operation at predetermined intervals, master controller 100 may adjust the transmitted data phase to enable slave device 110A to more optimally receive the write data.

Figure 3:
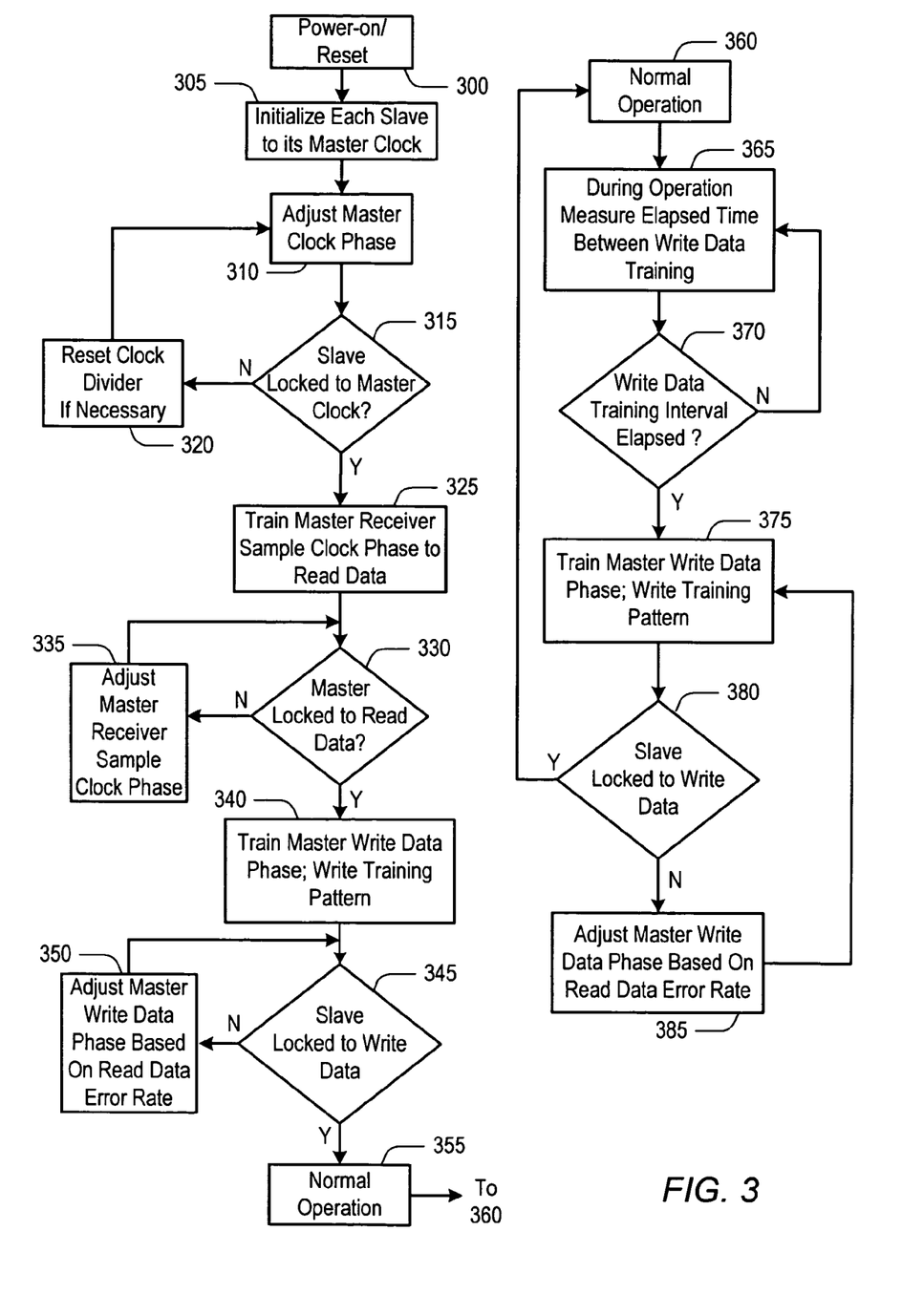
FIG. 3 is a flow diagram describing the operation of the embodiments shown in FIG. 1 and FIG. 2.

FIG. 3 is a flow diagram describing the operation of the embodiments shown in FIG. 1 and FIG. 2. As described above, master controller 100 may be configured to adaptively modify its clock, transmit, and receive characteristics such that it may transmit data that may be received correctly by the slave device, and it may correctly receive the data sent by the slave device.

Figure 4:
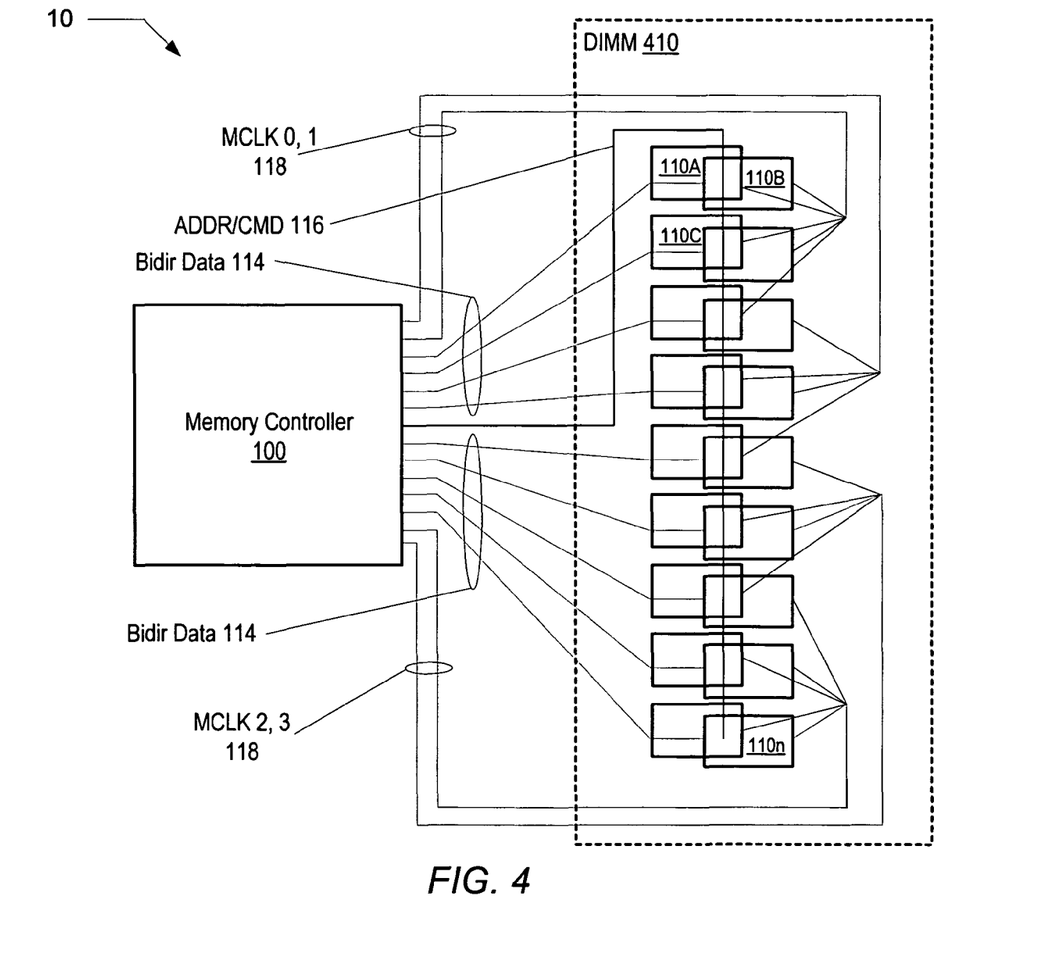
FIG. 4 is a block diagram of a specific embodiment of the system of FIG. 1.

FIG. 4 is a diagram depicting one implementation of the system shown in FIG. 1. As shown, system 10 is a memory subsystem including a memory controller 100 coupled to a dual in-line memory module (DIMM) 410. Thus, memory controller 100 is representative of the master controller 100 shown in FIG. 1 and DIMM 410 includes multiple DRAM devices 110A that are representative of slave devices 110 in FIG. 1.

In the illustrated embodiment, the clock signals 120 of FIG. 1 are depicted as MCLK 0-MCLK 3. In addition, as described above, the MCLK 1 is coupled to the first five DRAM devices 110 and MCLK 0 is coupled to the next four DRAM devices 110. Similarly, MCLK 2 and MCLK 3 are coupled to the next five and four DRAM devices. In the illustrated embodiment, the address/command 116 signal paths are coupled to the DRAM devices 110 in parallel, but from one end of the DIMM to the other. Thus this particular routing of the address/command signals causes signal skew from DRAM device to DRAM device, particularly the further apart they are. As described further below, each clock that is provided to a group of DRAM devices 110 may be phase adjusted independently of each other clock.

Referring collectively to FIG. 1 through FIG. 4 and beginning in block 300 of FIG. 3, after a reset or power-on condition (block 300), master controller 100 may independently align each clock signal so that each slave may correctly latch the address and command information (block 305). More particularly, in one embodiment, each of the clock signals (e.g., clock 0, clock 1, clock 2, etc.) may be routed to one or more respective slave devices 110 such that slave devices coupled to a common clock may have similar clock skew. In addition, as shown in FIG. 4, the address/command signal path 116 is routed to all slave devices in parallel, and from one end to the other end of DIMM 410. As such, the address/command signal timing at one slave device (e.g., 110A) having one clock (e.g., MCLK 1) may be significantly different than the address/command signal timing at another slave device (e.g., 110n) having a different clock (e.g., MCLK 2). However, the address/command signal skew may be close enough for slave devices coupled to a common clock such that the phase of the common clock may be adjusted to allow all the slave devices to which the common clock is coupled to correctly capture the address/command signals.

Thus to align the clocks 118, in one embodiment, each of slave devices 110 may have a predetermined value stored within storage 120A. This value may be accessed by sending a particular address or command to a slave device (e.g., 110A) that may cause the stored value to be sent from slave device 110 to master controller 100. If the clock divider circuit (e.g., FF 218) of slave device 110A is sampling the input clock correctly (block 310), master controller 100 may read back the correct value stored within storage 120A. However, to obtain a good initial margin, clock phase adjustment circuit 107 may sweep the clock phase over two cycles. In one embodiment, control unit 101 may provide a digital signal to phase adjustment circuit 107 to adjust the clock phase (block 310). During the time the clock phase is adjusted, the read data may be checked continually and control unit 101 may determine which range of clock phase adjustment produces the most accurate result and whether slave device 110A is locked to the master clock (block 315). It may be possible that one or more of the slave device dividers (FF 218) may be capturing the 1.6 GHz clock on the wrong edge. In such cases, slave logic 255 may provide a training reset signal to FF 218 (block 320). Once each slave device 110 is locked to its respective master clock (block 315), operation proceeds to block 325, where receive unit 104 of master controller 100 may be trained to receive correctly the read data from slave devices 110.

It is noted that in one implementation, during phase alignment training, data may be written and stored to slave device 110. However, in some embodiments, it may undesirable to provide special registers for use only during training. This may be especially true for DRAM devices. As such, the sense amplifiers of the DRAM device may be used as scratch pad storage during training. More particularly, when a bit value is read from a given memory cell, the charge stored in the cell may be transferred to the sense amp and subsequently read. However, there may be no need to write that data back to the individual storage cell.

Phase adjustment circuits 105 may adjust the sample clock phase to receive the read data and CRC data accurately. In one embodiment, control unit 101 may include circuits to determine whether receive unit 104 is optimally locked to the read data. If receive unit 104 is not optimally locked to the read data (block 330), control unit 101 may provide control signals to phase adjustment circuits 105. More particularly, in one embodiment, two samples may be made of the CRC data and the read data using a bang-bang phase detector within phase detect and adjust circuits 105. One sample may be made in the middle of the data, and one sample may be made on an edge of the data. From the results of these samples, control unit 101 may determine whether the sample is being taken early, late or in the middle. Based on the result, control unit 101 may adjust the phase of the receive phase adjustment circuits 105 (block 335). If receive unit 104 is locked to the read data (block 330), operation proceeds to block 340 where the transmit unit 102 may be trained to write data that the slave devices can read. It is noted that during normal operation, receive unit 104 may be continuously trained whenever read data is received.

When master controller 100 determines that the receive unit 104 is locked to the read data and the CRC data (block 330), master controller 100 attempts to train the transmit unit 102 to send data that the slave device 110 can correctly receive. More particularly, master controller 100 sends a write data training pattern to slave device 110 (block 340). In one implementation, the training pattern may include many zero to one and one to zero transitions. Control unit 101 may determine whether the slave is locked to the write data. If control unit 101 determines the slave is not locked to the write data (block 345), control unit 101 may adjust the phase of the write data. In one embodiment, the write data phase may be adjusted far enough to cause the write data to be latched and stored incorrectly by slave device 110 at a nearly 50% error rate on transition bits (e.g., zero to one transitions) as seen on the read data (block 350). The 50% transition error rate may be indicative that the write data is being sampled near an edge. The write data phase may then be adjusted back 0.5 data bit time. Doing so should cause FF 208 to sample the data somewhere near the middle of each data bit. This process may be performed for each data signal path for each slave device 110. If the master controller 100 determines that slave device 110 is locked to the data, system 10 may begin normal operation (block 355).

Proceeding to block 360, during normal operation of system 10, the various clock and data phases may drift due to such temperature differences of the die. As mentioned above, the read data phase alignment may be continually checked by master controller 100 as long as there are reads occurring and data is being transferred on the data paths. However, large gaps in bus traffic may allow the phase to drift undetected. As such, control unit 101 may train the write data phase at predetermined intervals by measuring elapsed time between training sequences (block 365). If the elapsed time between training of the write data phase exceeds a limit (block 370), control unit 101 train the write data phase as described above by writing the write data training pattern having many transitions (block 375) and adjusting the write data phase (block 385) while looking for a nearly 50% transition error rate as described above in blocks 345-350. If control unit 101 determines the slave device 110 is locked to the write data (block 380), system 10 continues normal operation.

Referring to FIG. 5, an exemplary pin diagram of one embodiment of the memory module of FIG. 4 is shown. In the embodiment shown in FIG. 4, the memory module is a DIMM. As is typical, the DIMM includes a circuit board with a finger connector that usually slides into a socket. The finger connector has metallic pads that mate with spring-loaded contacts in the socket. The various signals are routed from the finger connector to the DRAM devices. To obtain clock signals with desirable signal quality, the clock signals are placed at the ends of the finger connector as shown in the pin diagram.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a slave device; and
   a master device coupled to the slave device and configured to control data transfer between the master device and the slave device, wherein the master device is configured to provide one or more clock signals to the slave device;
   wherein, during an initialization mode the master device is further configured to modify a phase alignment of the one or more clock signals, and to subsequently modify a phase alignment of data transmitted from the master device based upon information received from the slave device;
   wherein the information received from the slave device includes cyclic redundancy code (CRC) information sent via one or more unidirectional CRC data paths, wherein the CRC information corresponds to data sent by the master device via a plurality of bidirectional data paths.

2. The system as recited in claim 1, wherein the master device includes a receiver phase adjustment circuit configured to adaptively modify a phase alignment of a receiver sample clock of the master device dependent upon the CRC information.

3. The system as recited in claim 1, wherein the master device includes a receiver phase adjustment circuit configured to adaptively modify a phase alignment of a receiver sample clock of the master device dependent upon data received from the slave device during each read operation performed by the master device.

4. The system as recited in claim 3, wherein the slave device is configured to access the data from a storage within the slave device.

5. The system as recited in claim 4, wherein accessing the storage comprises accessing one or more sense amplifiers of the storage.

6. The system as recited in claim 1, wherein the master device is configured to transmit a predetermined command upon address/command signal paths, and to adjust the phase alignment of the one or more clock signals dependent upon data received from the slave in response to the predetermined command.

7. A method comprising:
   a master device controlling data transfer between the master device and a slave device;
   the master device providing one or more clock signals to the slave device; and
   during an initialization mode the master device modifying a phase alignment of the one or more clock signals, and subsequently modifying a phase alignment of data transmitted from the master device based upon information received from the slave device;

wherein the information received from the slave device includes cyclic redundancy code (CRC) information sent via one or more unidirectional CRC data paths, wherein the CRC information corresponds to data sent by the master device via a plurality of bidirectional data paths.

8. The method as recited in claim 7, further comprising the master device adaptively modifying a phase alignment of a receiver sample clock of the master device dependent upon the CRC information.

9. The method as recited in claim 7, further comprising the master device adaptively modifying a phase alignment of a receiver sample clock of the master device dependent upon data received from the slave device during each read operation performed by the master device.

10. The method as recited in claim 9, further comprising the slave device accessing the data from a storage within the slave device.

11. The method as recited in claim 10, wherein accessing the storage comprises accessing one or more sense amplifiers of the storage.

12. The method as recited in claim 7, further comprising the master device transmitting a predetermined command upon address/command signal paths, and adjusting the phase alignment of the one or more clock signals dependent upon data received from the slave in response to the predetermined command.

13. A memory subsystem comprising:
a memory device; and
a memory controller coupled to the memory device and configured to control data transfer between the memory controller and the memory device, wherein the memory controller is configured to provide one or more clock signals to the memory device;
wherein, during an initialization mode the memory controller is further configured modify a phase alignment of the one or more clock signals, and to subsequently modify a phase alignment of data transmitted from the memory controller to the memory device based upon information received from the memory device;
wherein, during normal operation the memory controller is further configured to adaptively modify the phase alignment of the data transmitted by the memory controller via a plurality of bidirectional data paths depending upon a calculated error rate of data received from the memory device.

14. The memory subsystem as recited in claim 13, wherein the memory controller includes a receiver phase adjustment circuit configured to adaptively modify a phase alignment of a receiver sample clock of the memory controller dependent upon data received from the memory device during each read operation performed by the memory controller.

15. The memory subsystem as recited in claim 14, wherein the memory controller is configured to transmit a predetermined pattern to the memory device and to adjust the phase alignment of the transmit data in one direction until a substantially 50% calculated error rate is achieved, and to subsequently adjust the phase alignment of the transmit data in the other direction an amount substantially equal to one half of a data bit period.

16. A system comprising:
a slave device; and
a master device coupled to the slave device and configured to control data transfer between the master device and the slave device, wherein the master device is configured to provide one or more clock signals to the slave device;
wherein, during an initialization mode the master device is further configured to modify a phase alignment of the one or more clock signals, and to subsequently modify a phase alignment of data transmitted from the master device based upon information received from the slave device;
wherein the master device includes a receiver phase adjustment circuit configured to adaptively modify a phase alignment of a receiver sample clock of the master device dependent upon data received from the slave device during each read operation performed by the master device;
wherein the slave device is configured to access the data from a storage within the slave device; and
wherein accessing the storage comprises accessing one or more sense amplifiers of the storage.

17. A system comprising:
a slave device; and
a master device coupled to the slave device and configured to control data transfer between the master device and the slave device, wherein the master device is configured to provide one or more clock signals to the slave device;
wherein, during an initialization mode the master device is further configured to modify a phase alignment of the one or more clock signals, and to subsequently modify a phase alignment of data transmitted from the master device based upon information received from the slave device; and
wherein, during normal operation the master device is further configured to adaptively modify the phase alignment of the data transmitted by the master device via a plurality of bidirectional data paths depending upon a calculated error rate of data received from the slave device.

18. The system as recited in claim 17, wherein the master device is configured to transmit a predetermined pattern to the slave device and to adjust the phase alignment of the transmitted data in one direction until a substantially 50% calculated transition error rate is achieved, and to subsequently adjust the phase alignment of the transmitted data in the other direction an amount substantially equal to one half of a data bit period.

19. A method comprising:
a master device controlling data transfer between the master device and a slave device;
the master device providing one or more clock signals to the slave device;
during an initialization mode the master device modifying a phase alignment of the one or more clock signals, and subsequently modifying a phase alignment of data transmitted from the master device based upon information received from the slave device;
the master device adaptively modifying a phase alignment of a receiver sample clock of the master device dependent upon data received from the slave device during each read operation performed by the master device; and
the slave device accessing the data from a storage within the slave device;
wherein accessing the storage comprises accessing one or more sense amplifiers of the storage.

20. A method comprising:
a master device controlling data transfer between the master device and a slave device;
the master device providing one or more clock signals to the slave device;

during an initialization mode the master device modifying a phase alignment of the one or more clock signals, and subsequently modifying a phase alignment of data transmitted from the master device based upon information received from the slave device; and during normal operation the master device adaptively modifying the phase alignment of the data transmitted by the master device via a plurality of bidirectional data paths dependent upon a calculated error rate of data received from the slave device.

21. The method as recited in claim 20, further comprising the master device transmitting a predetermined pattern to the slave device and adjusting the phase alignment of the transmitted data in one direction until a substantially 50% calculated transition error rate is achieved, and subsequently adjusting the phase alignment of the transmitted data in the other direction an amount substantially equal to one half of a data bit period.

* * * * *